(12) United States Patent
Polehn et al.

(10) Patent No.: US 9,851,449 B2
(45) Date of Patent: Dec. 26, 2017

(54) ROBUST POSITION DETERMINATION IN COMMUNICATION SYSTEMS

(71) Applicant: Verizon Patent and Licensing Inc., Arlington, VA (US)

(72) Inventors: Donna L. Polehn, Kirkland, WA (US); Thomas H. Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 202 days.

(21) Appl. No.: 14/839,332

(22) Filed: Aug. 28, 2015

(65) Prior Publication Data
US 2017/0059717 A1 Mar. 2, 2017

(51) Int. Cl.
| | |
|---|---|
| *G01S 19/47* | (2010.01) |
| *G01S 19/48* | (2010.01) |
| *H04W 64/00* | (2009.01) |
| *G01S 19/49* | (2010.01) |
| *H04W 88/08* | (2009.01) |

(52) U.S. Cl.
CPC .............. *G01S 19/48* (2013.01); *G01S 19/49* (2013.01); *H04W 64/003* (2013.01); *H04W 88/085* (2013.01)

(58) Field of Classification Search
CPC ....... G01S 19/47; G01S 19/25; H04W 64/003
USPC ...................................................... 342/357.3
See application file for complete search history.

(56) References Cited

U.S. PATENT DOCUMENTS

| | | | |
|---|---|---|---|
| 2012/0326922 A1* | 12/2012 | Yang | G01S 19/49 342/357.3 |
| 2014/0003199 A1* | 1/2014 | Dougan | G04G 7/00 368/46 |
| 2014/0232593 A1* | 8/2014 | Varoglu | G01S 19/48 342/357.28 |
| 2015/0097731 A1* | 4/2015 | Russell | G01S 19/48 342/450 |
| 2015/0338525 A1* | 11/2015 | Valentino | G01J 1/0219 250/395 |
| 2016/0047675 A1* | 2/2016 | Tanenhaus | G01C 21/16 702/104 |

* cited by examiner

*Primary Examiner* — Harry Liu (57) ABSTRACT

Methods that determine position of network devices in a robust manner may include a method for determining a position of a remote radio head. The method may include generating position values of the remote radio head based on signals received by a satellite positioning system (SPS) receiver, and generating additional position values of the remote radio head from a supplemental positioning unit. The method may include determining whether an error of at least one of the position values exceeds a threshold, and storing a last position value from position values having an error within the threshold, in response to determining that the error of at least one of the position values exceeds the threshold. The method may further include calculating an updated position value of the remote radio head based on at least one of the additional position values.

20 Claims, 8 Drawing Sheets

ROBUST POSITION DETERMINATION IN COMMUNICATION SYSTEMS

BACKGROUND

Mobile wireless communication systems include network devices that may rely on Global Positioning System (GPS) for position information. Position information may be used in a wide variety of applications, from assisting a user to a desired location within a mapping application, to guiding first responders to a location of an emergency in response to a 911 call. Depending upon the environment, a network device may not have a clear line of sight to a sufficient number of GPS satellites to compute a position accurately enough to locate the network device.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to approaches for determining position values of a network device, when the network devices transitions to an area where satellite positioning system (SPS) signals may be insufficient to determine a position value. Various network devices within a communications network may include a robust position determination system, which may use an SPS receiver to determine position when the SPS receiver has a line of sight to a sufficient number of satellites. When the line of sight to a number of satellites are obscured, for example, by moving into an area which blocks SPS signals, the robust position determination system may use one or more supplemental positioning units to obtain an accurate position. The supplemental position units do not rely upon SPS signals to determine position, and may operate based on the measurements of different quantities, as will be described in more detail below in reference to FIG. 5.

Network devices that may benefit from robust positioning systems include devices that may be moved between areas having SPS coverage and areas not having SPS coverage. Network infrastructure equipment, such as remote radio heads that may be moved during initial set-up and operation, may undergo SPS coverage transitions, and thus may benefit from robust positioning systems. Additionally, user equipment devices (UEs) may also benefit from robust positioning systems capable of generating accurate position data when the UEs move to areas lacking SPS signal coverage.

Figure 1:
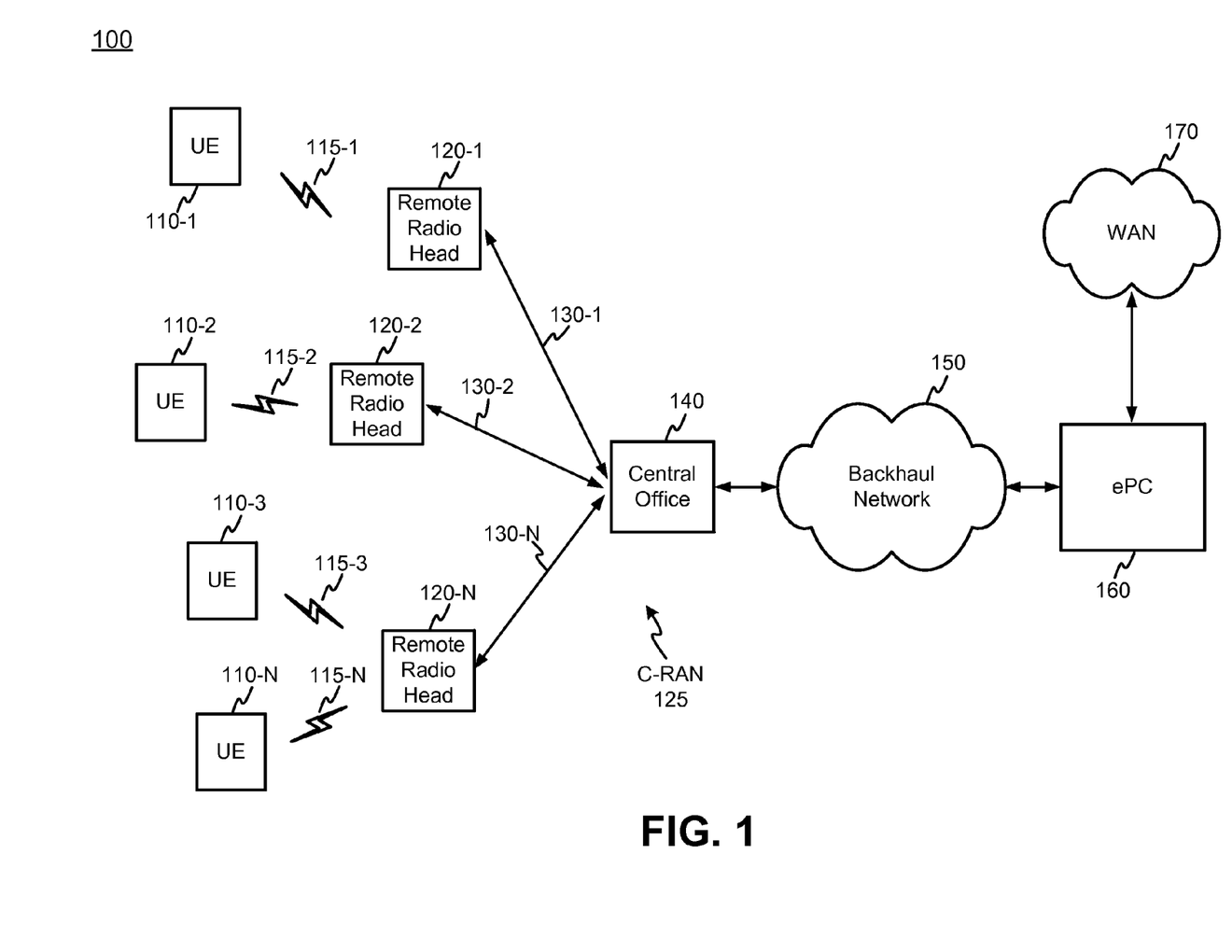
FIG. 1 is a diagram illustrating an exemplary network environment with network device(s) having a robust position determination system.

FIG. 1 is a diagram illustrating an exemplary network environment 100 that includes one or more network devices that may utilize robust position determination systems. Network environment may include user equipment devices (UEs) 110 (plurally referred to as "UEs 110" and individually as "UE 110-x"), a cloud radio access network (C-RAN) 125, a backhaul network 150, an evolved packet core (ePC) 160, and a wide area network (WAN) 170. The C-RAN 125 may further include remote radio heads (RRHs) 120 (plurally referred to as "RRHs 120" and individually as "RRH 120-x") and at least one central office 140 (where only one is shown in FIG. 1 for brevity).

UEs 110 may wirelessly access ePC 160 though C-RAN 125 via backhaul network 150. Each RRH 120 may establish one or more cells to provide wireless connectivity over wireless channels 115 (plurally referred to as "wireless channels 115 and individually as "wireless channel 115-x) in a designated area. For example, referring to FIG. 1, the proximity of UE 110-1 to RRH 120-1 may cause UE 110-1 to exchange data and control signals with RRH 120-1 through wireless channel 115-1. The proximity of UE 110-2 to RRH 120-2 may cause UE 110-2 to exchange data and control signals with RRH 120-2 through wireless channel 115-2. The proximity of UE 110-3 and UE-110-N to RRH 120-N may cause UE 110-3 and UE-110-N to exchange data and control signals with RRH 120-N through wireless channel 115-N.

The RRHs 120 may exchange data with central office 140, which includes forwarding data received from UEs 110 to central office 140, and receiving data from central office 140 for forwarding to appropriate UEs 110. In one embodiment, RRHs 120 and central office 140 may exchange data over wired channels 130 (plurally referred to herein as "wired channels 130" and individually as "wired channel 130-x"). In some embodiments, the wired channels may include fiber optic connections based on the common public radio interface (CPRI). Alternatively, wired channels 140 may use other protocols, such as, for example the open base station architecture initiative (OBSAI). In other embodiments, wireless connections (e.g., such as microwave relays) may be used instead of one or more wired connections 130 as a communications interface between RRHs 120 and central office 140.

Central office 140 may interface with ePC 160 though backhaul network 150. While FIG. 1 only shows one central office 140 connected to backhaul network 150, backhaul network 150 may be connected to a plurality of central offices, which in turn may be connected to other RRHs. In an embodiment, central offices communicate with each other to, for example, distribute processing loads improve the quality of service of UEs 110 operating within network environment 100. The backhaul network 150 may interface to ePC 160 which handles data flows over user plane traffic (e.g., Access Stratum functionality), and perform control operations for central office 140 and UEs 110 based at least in part on control plane signals (e.g., Non-Access Stratum functionality). EPC 160 may interface with WAN 170 to exchange data with other network devices. WAN 170 may include a plurality of networks which can span large areas, and may include the Internet, thus enabling UEs 110 to communicate over practically any geographical distance.

UEs 110 may include any type of mobile device having communication capabilities, and thus communicate with the appropriate RRHs 120 using a variety of different wireless channels. In some embodiments, the mobile device may be configured to additionally or alternatively communicate within network environment 100 using a wired connection. Thus a UE 110-x may be a mobile device that may include, for example, a cellular radiotelephone, a smart phone, a tablet, a set-top box (STB), a mobile phone, any type of internet protocol (IP) communications device, a Voice over Internet Protocol (VoIP) device, a laptop computer, a palm-top computer, a wearable computer, a gaming device, a media player device, or a digital camera that includes communication capabilities (e.g., wireless communication mechanisms such as Wi-Fi). In various embodiments, the wireless channels 115 may be supported by any cellular radio access network (RAN), such as, for example, a longer term evolution (LTE) evolved universal terrestrial radio access network (eUTRAN). In other embodiments, the wireless channel 115 may be supported by a local or wide area wireless network. A local area wireless network may include any type of WiFi (e.g., any IEEE 801.11x network, where x=a, b, c, g, and/or n). A wide area wireless network may include any type wireless network covering larger areas, and may include a mesh network (e.g., IEEE 801.11s) and/or or a WiMAX IEEE 802.16. Details of an embodiment of a UE are discussed below in reference to FIG. 6.

A conventional base station, such as, for example, an eNodeB in LTE systems, may be replaced by C-RAN 125, which may include the RRH 120 and the central office 140 as shown in FIG. 1. Dividing the base station into separate units allows a wireless network operator to flexibly establish and modify wireless coverage in a cost effective manner. RRHs 120 may provide radio frequency (RF) functionality to establish wireless channels 115 with UEs 110. The RRHs 120 may be embodied in different form factors having different sizes and various capabilities. In an embodiment, one or more RRHs 120 may provide the same wireless coverage as a macro-cell (e.g., eNodeB). In another embodiment, one or more RRHs 120 may be realized as a small cell (e.g., a femto-cell) to provide wireless coverage over smaller areas, which may include indoor placements. Details of RRHs 120 are discussed below in reference to FIG. 2. Central office 140 may provide routing, load balancing, and digital base band functionality for communications between UEs 110 and ePC 160. Central office 140 may be physically displaced from the RRHs 120, and may consolidate processing resources that may be shared among the RRHs 140. Details of central office 140 are described in relation to FIG. 3.

C-RAN 125 may be configured to operate in accordance with one or more known wireless standards, and provide the flexibility to be reconfigurable with respect to improvements of existing standards and future standards for any type of radio access network, and can be compatible with known wireless standards. Such standards may include, for example, LTE, LTE Advanced, GSM, UMTS, IS-2000, etc. In some embodiments, eNodeB 110 may be a wireless access point which can service any type of WiFi standard (e.g., any IEEE 801.11x network, where x=a, b, c, g, and/or n), and/or include any other type of wireless network technology for covering larger areas, and may include a mesh network (e.g., IEEE 801.11s) and/or a WiMAX IEEE 802.16.

Backhaul network 150 may be any type network that supports one or more central offices 140 for interfacing with ePC 160. Backhaul network 150 may include Cell Site Routers (CSRs), Extended Back Haul (EBH) network(s), optical networks that include wavelength division multiplexed (WDM) optical components, multiservice provisioning platforms (MSPPs), metro-Ethernet networks, multi-protocol label switching (MPLS) networks, optical transport networks (OTN), etc.

EPC 160 may be a core networking infrastructure that provides mobility management, session management, authentication, and packet transport to support UEs 110 and C-RAN 125 for wireless communication, and further provides wireless networking elements access to WAN 170. ePC 160 may be compatible with known wireless standards which may include, for example, LTE, LTE Advanced, Global System for Mobile Communications (GSM), Universal Mobile Telecommunications System (UMTS), IS-2000, etc.

WAN 170 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Additionally, embodiments described herein may be presented within the context of the Long Term Evolution (LTE) wireless standard for ease of explanation. However, aspects of the invention are not restricted to the LTE standard, and may be applied to other networking standards, such as, for example, LTE Advanced, Global System for Mobile Communications (GSM), Universal Mobile Telecommunications System (UMTS), IS-2000, etc.

Figure 2:
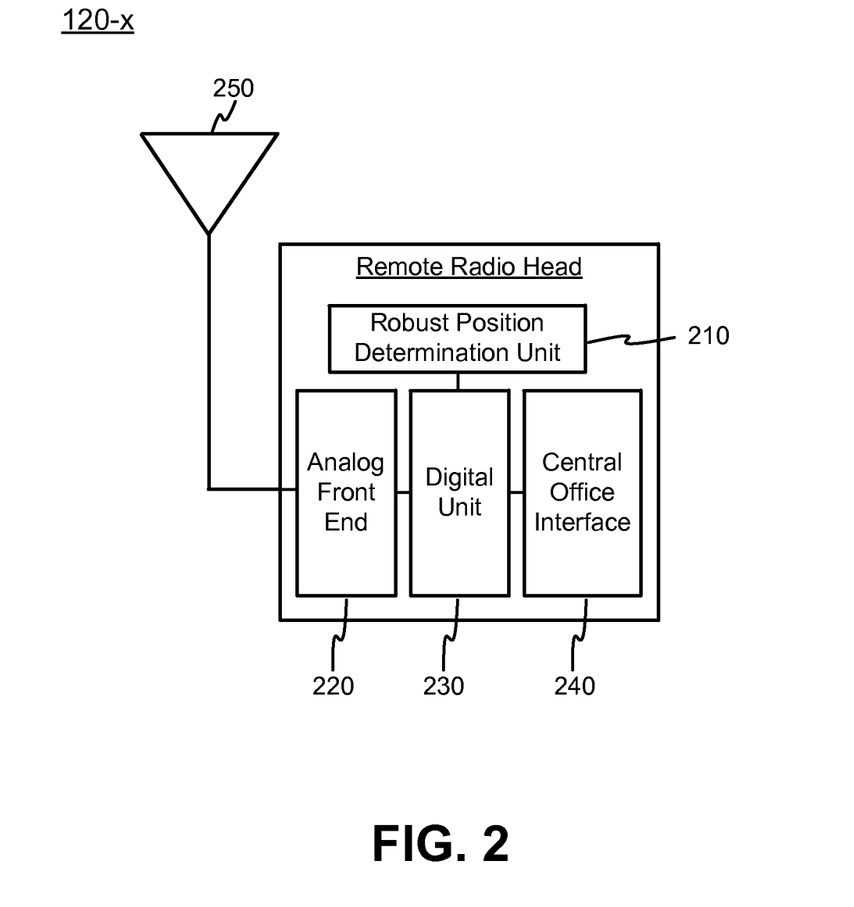
FIG. 2 is a diagram depicting exemplary details of a remote radio head which may be included in network environment shown in FIG. 1.

FIG. 2 is a block diagram depicting exemplary functionality of an RRH 120-x which may be included in network environment shown in FIG. 1. RRH 120-x may include a robust determination unit 210, an analog front end 220, a digital unit 230, a central office interface 240, and an antenna 250. RRH 120-x may be designed for indoor and/or outdoor use, and may be relatively small compared to traditional base stations. RRH 120-x may be ruggedly constructed for ease of portability and operation without air conditioning facilities. Given its relative simplicity, RRH 120-x may be suitable for use as a small cell, which may include, for example, e-femtocells, microcells, etc., suitable for both commercial and/or domestic applications.

RRH 120-x may act as a transceiver to exchange RF signals with one or more UEs 110 located within the cell established by RRH 120-x. On the uplink channel, RRH 120-x may receive RF signals transmitted by UE(s) 110 over wireless channels 115 at antenna 250. Antenna 250 may provide the received RF signals to analog front end 220. Analog front end 220 may condition the received signal (as discussed in more detail below in reference to FIG. 4) and down convert the frequency of the received RF signals to an intermediate frequency for digitization in digital unit 230. Digital unit 230 may perform some sample rate conversion, data formatting, and/or may add additional data (such as, for example, the position of RRH 120-x, as explained in more detail in FIG. 4) so the digitized signals are in a suitable form to be provided to central office interface 240. Central office interface 240 may convert the received digitize signals in to a packet and/or frame format suitable for transmission over wired connections 130. On the downlink channel, RRH 120-x may receive digital data from the central office 140. Central office interface 240 may receive the digital data over wired connection 130. Central office interface 240 may reformat the data and/or perform error correction, and provide the data to digital unit 230. Digital unit 230 may perform digital frequency up conversion, sample rate conversion, and/or various digital signal conditioning (described in more detail in reference to FIG. 4) prior to conversion to an analog signal. Analog front end 220 may receive the analog signal from digital unit 230, perform analog frequency up conversion to RF, and amplify the RF signal prior to transmission over antenna 250. Central office interface 240 may use, for example, the CPRI and/or the OBSAI protocol.

A variety of services may rely on RRH 120-x having the capability to provide a reasonably accurate position value of where RRH 120-x is located. For example, in order to provide emergency services, such as E911 service, the location of the RRH 120-x should be known to an accuracy specified in standards and/or regulations. When establishing a conventional RRH 120-x in a particular location, a technician may provide a position value of the location during a setup procedure, where the RRH 120-x may store the position value. During the setup procedure, a separate instrument, such as a portable SPS receiver, may provide the position value of the location. However, in some embodiments, RRH 120-x can be easily transported by a single person give its small size, and thus RRH 120-x may be moved by unauthorized persons without properly resetting the stored position value, and thus RRH 120-x will report an incorrect position value to services requesting such information.

Alternatively, in other situations, human errors in the setup procedure may lead to RRH 120-x having an unsuitably inaccurate position. Robust position determination unit 210 may avoid the aforementioned situations causing position value inaccuracies of RRH 120-x, by determining an accurate position value during the setup procedure. While robust position determination unit 210 may rely on an SPS receiver to determine position, one or more additional position determination systems may be included, so positions of RRH 120-x may be accurately determined even if RRH 120-x is moved from areas having SPS coverage to areas not having SPS coverage. In an embodiment, robust position determination unit 210 may automatically detect movement of the RRH 120-x, and may determine a new position value of the location to which RRH 120-x is moved without operator intervention. Upon generating a position value, robust position determination unit 210 may provide the position value to digital unit 230 so that the position value may be added to the digital data being provided to central office 140.

Figure 3:
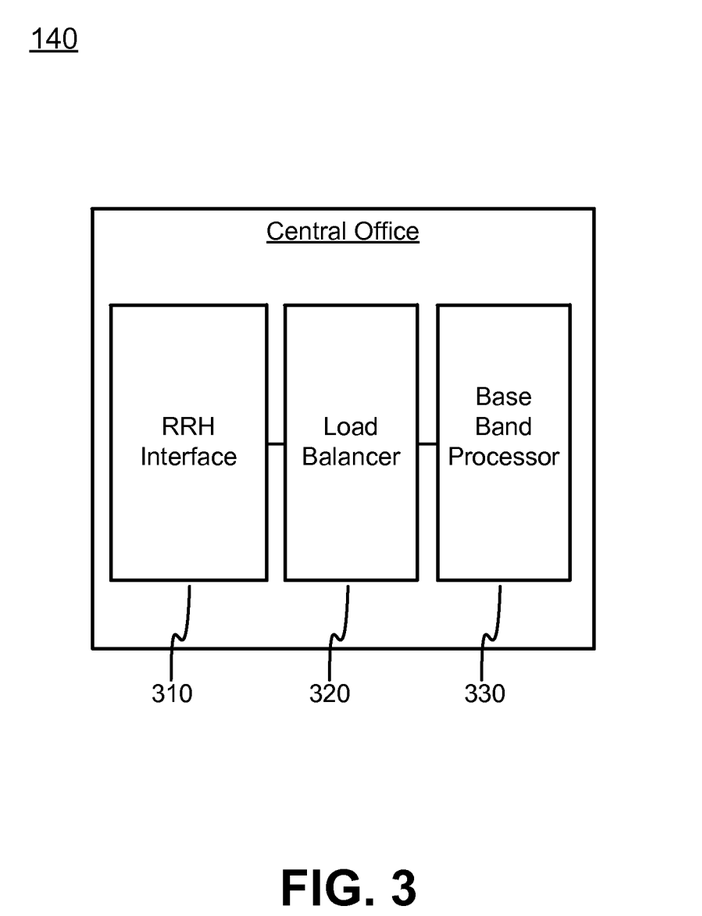
FIG. 3 is a diagram depicting exemplary details of a central office which may be included in network environment shown in FIG. 1.

FIG. 3 is a block diagram depicting exemplary functionality of central office 140 which may be included in network environment 100 shown in FIG. 1. Central office 140 may include an RRH interface 310, a load balancer, and a base band processor 330. Central office 140 may consolidate the intensive base band processing used for proper communications across wireless channels 115 into a single location. By not replicating base band units at each RRH 120-x location in C-RAN 125, equipment costs and space may be saved at each location, and overall power consumption may be reduced.

Central office 140 may exchange control and communication data between RRHs 120 and ePC 160. In some embodiments, central office 140 also communicate with other central offices attached to backhaul network 150 to perform distributed processing and/or load balancing among central offices within network environment 100. On the uplink channel, central office 140 may receive digital data over wired connections 130 at RRH interface 310. The digital data may include signals originating from UE 110 which may have been down converted to an intermediate frequency. RRH interface 310 may perform error correction decoding and framing to reformat the received data for subsequent processing by load balancer 320 and base band processor 330. Load balancer 320 may manage traffic flows from all of the RRHs 120 to maintain quality of service (QoS) requirements among UEs 110. Load balancer 320 may provide data to base band processor 330 which may digitally down convert the data to base band, perform symbol demodulation, demultiplex orthogonal frequency division multiple access (OFDMA) signals from multiple UEs 110, perform error correction decoding, and/or multiple input multiple output (MIMO) processing, to form individual data flows for UEs 110 which may be provided to backhaul network 150. On the downlink channel, central office 140 may receive base band data from backhaul network 150, where base band processor 330 may perform symbol modulation, multiplex signals from multiple UEs 110 using OFDMA processing, perform error correction encoding, and/or MIMO processing to combine data flows from multiple UEs 110. Load balancer 320 may receive data from base band processor 330 and manage data flows based on QoS requirements, and provide the managed data flows to RRH interface 310. RRH interface may perform error correction encoding and/or framing to reformat the managed data flows for transmission over wired connections 130 to the appropriate RRHs 120. RRH interface 310 may be based on the CPRI protocol and/or the OBSAI protocol.

Figure 4:
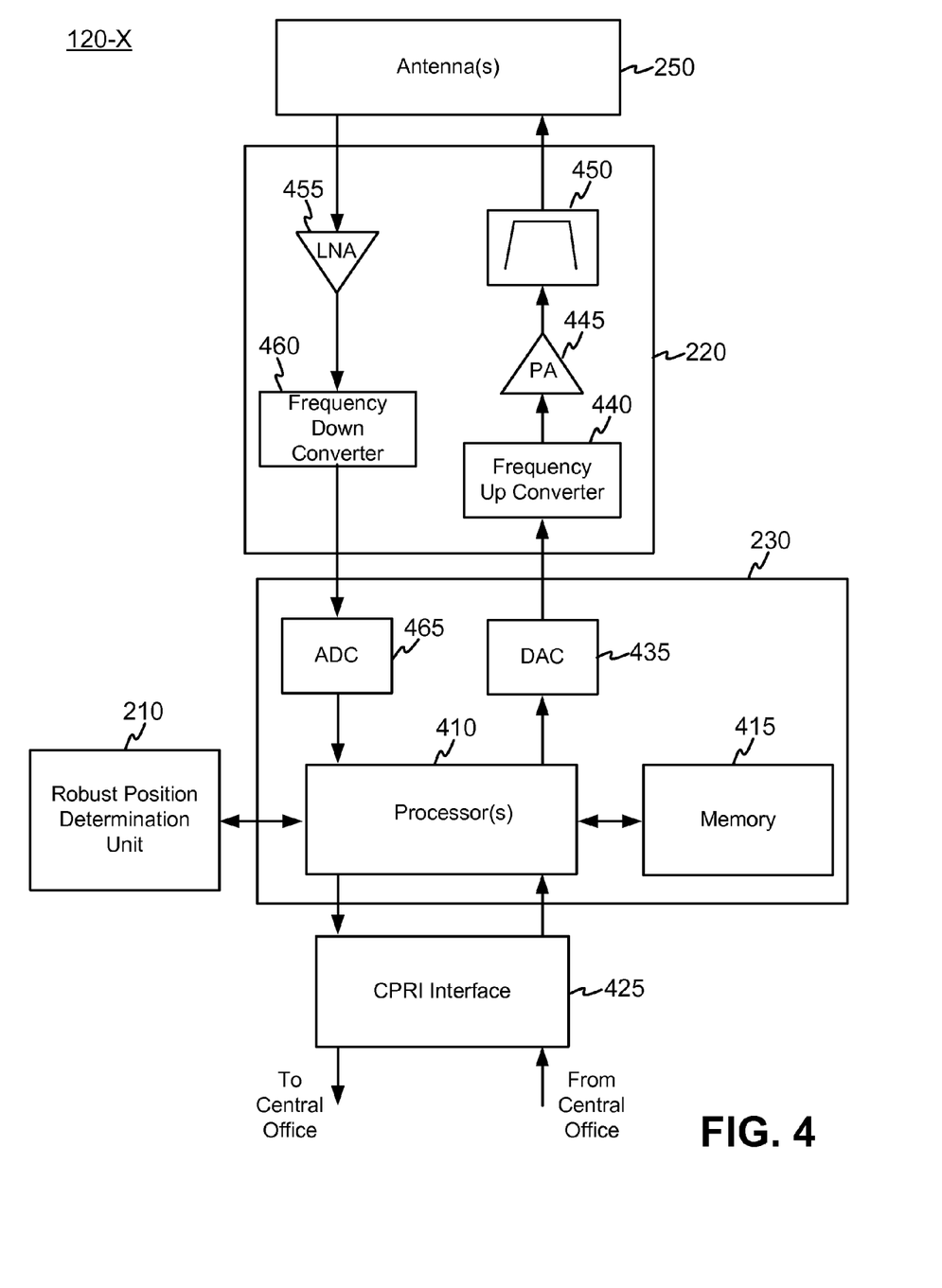
FIG. 4 is a block diagram showing exemplary components of a remote radio head according to an embodiment.

FIG. 4 is a block diagram showing exemplary components of a RRH 120-x according to an embodiment. RRH 120-x may include antenna(s) 250, analog front end 220, digital unit 230, robust position determination unit 210, and CPRI interface 425. Analog front end 220 may further include frequency up-converter 440, power amplifier 445, filter 450, low noise amplifier (LNA) 455, and frequency down-converter 460. Digital unit 230 may further include processor(s) 410, memory 415, digital-to-analog converter (DAC) 435, and analog-to-digital converter (ADC) 465.

On the uplink channel, antenna(s) 250 may receive RF signals transmitted by UE(s) 110 over wireless channels 115 at antenna(s) 250. Antenna(s) 250 may be embodied in a multi-antenna configuration to facilitate a ground coverage pattern for wireless access, perform beam steering, and/or provide multiple input multiple output (MIMO) operation. Antenna(s) 250 may provide the received RF signals to (LNA) 455, which may amplify the low-level RF signals while maintaining a low noise figure. The amplified RF signal may then be mixed to an intermediate frequency (IF) by frequency down converter 460. Frequency down converter 460 may be an analog mixer that lowers the center frequency of the amplified RF signal prior to digitization, and passes the signal to digital unit 230.

Within digital unit 230, the IF signal may be received by ADC 465 for digitization. Once the IF signal is in a digital format, processor(s) 410 may perform further digitally frequency down conversion operations, sample rate conversion, and/or data formatting operations for subsequent transmission over CPRI interface 425. The data formatting operations may include the processor bundling position data received from robust position determination unit 210. The position data may represent the most accurate position data of the RRH 120-*x*, and may be based on positions determined by a plurality of positioning units, which may permit accurate position determination even when SPS signals are unavailable. For example, robust position determination unit 210 may combine an initial position based on an SPS receiver with positioning updates generated by supplemental positioning units, where the supplemental positioning units do not rely on SPS signals. Combining the initial position with the position updates provides an accurate position of the RRH 120-*x* even in the absence of SPS signals. In another embodiment, robust position determination system 210 may provide both the initial position value and the updates to processor(s) 410, so processor 410 may generate a combination of the two datasets to determine an accurate position of RRH 120-*x*. Details of the robust position determination unit are described in reference to FIG. 5. Processor(s) 410 may pass data to CPRI interface 425, for transmission over wired connections 130 to central office 140.

On the downlink channel, CPRI interface 425 may receive data from the central office 140 over wired connection 130. CPRI interface 425 may reformat the data and/or perform error correction, and provide the data to processor(s) 410. Processor(s) 410 may initially digitally up-convert the frequency of the received data to an intermediate frequency. Because RRH 120-*x* may receive reference timing signals over CPRI interface 425 from central office 140, processor(s) 410 may also perform resampling operations on the received data to change the original sampling rate to one which is synchronous with the received reference timing signal. Resampling in such a manner may make subsequent digital signal processing operations performed by processor(s) 410 more efficient. Processor(s) 410 may then perform a number of signal conditioning operations on the data. For example, processor 410 may perform crest factor reduction to lower the peak to average ratio (PAPR), as high peak to average ratios may become undesirably high when wireless channels use OFDMA. Processor(s) 410 may also perform digital predistortion to compensate for distortions in the signal path, which may include distortions caused by analog components in analog front end 220. Processor(s) 410 may provide processed data to DAC 435 for conversion to an analog signal. DAC 435 may provide the analog signal to analog front end 220, where the analog signal may initially be up-converted to translate the signal to an RF frequency for transmission, and provided to PA 445. PA 445 will amplify the signal with sufficient power so UE 110-*x* receives the signal with a sufficient signal-to-noise ratio such that bit error rates are within specification. The amplified RF signal may be band limited by band pass filter 450 prior to transmission by antennas 250.

Processor(s) 410 may include one or more processors, microprocessors, digital signal processors, controllers, etc., that may execute instructions provided from memory 415. Processor(s) 410 may further include device such as application specific integrated circuits (ASICs), field programmable gate arrays (FPGAs), and/or custom devices that execute processing logic in hardware. Memory 415 may include a random access memory (RAM) or another type of dynamic storage device, a read only memory (ROM) or another type of static storage device, a removable memory module, and/or another type of memory to store data and/or instructions that may be used by processor(s) 410.

CPRI interface 425 may include custom logic hardware such as ASICs, FPGA, and/or general purpose processors to communicate over wired connections 130. The CPRI protocol may carry three different information flows: user plane, control and management plane, and synchronization plane data. The CPRI protocol may include Layer 1 and Layer 2 strata, where Layer 1 may include the physical and time division multiplexing layers. The physical layers include capabilities for both electrical and optical data transmission and reception. Layer 2 may include user data in the form of in-phase and quadrature (IQ) data. Layer 2 may further include control and monitoring data in the form of vendor specific data, Ethernet data, and/or high level data link control (HDLC) data. Layer 2 may further include synchronization data for frame and time alignment. According, RRH 120-*x* may obtain accurate timing data over wired connections 130 for use as an accurate timing reference, and need not reply upon an SPS receiver in robust position determination unit 210 for an accurate time reference. While not shown in FIG. 4, RRH 120-*x* may further include a timing module which may provide a backup timing reference, for example, over short periods of time, in the event the timing data over wired connections 130 is temporarily corrupted or otherwise unavailable. CPRI interface 425 may include optical modules for transmitting and receiving optical data when wired connections 130 are optical fiber.

As described herein, RRH 120-*x* may perform certain operations in response to processor(s) 410 executing software instructions contained in a computer-readable medium, such as memory 415. A computer-readable medium may be defined as a non-transitory memory device. A non-transitory memory device may include memory space within a single physical memory device or spread across multiple physical memory devices. The software instructions may be read into memory 415 from another computer-readable medium or from another device via wired connection 130. The software instructions contained in memory 415 may cause processing unit 410, in conjunction with robust position determination unit 210, to generate and provide position data of RRH 120-*x* in an environment with or without SPS signal coverage. Alternatively, hardwired circuitry may be used in place of, or in combination with, software instructions to implement processes described herein. Thus, implementations described herein are not limited to any specific combination of hardware circuitry and software.

Although FIG. 4 shows example components of RRH 120-*x*, in other implementations, RRH 120-*x* may include fewer components, different components, differently arranged components, or additional components than those depicted in FIG. 4. Additionally or alternatively, one or more components of RRH 120-*x* may perform the tasks described as being performed by one or more other components of RRH 120-*x*

Figure 5:
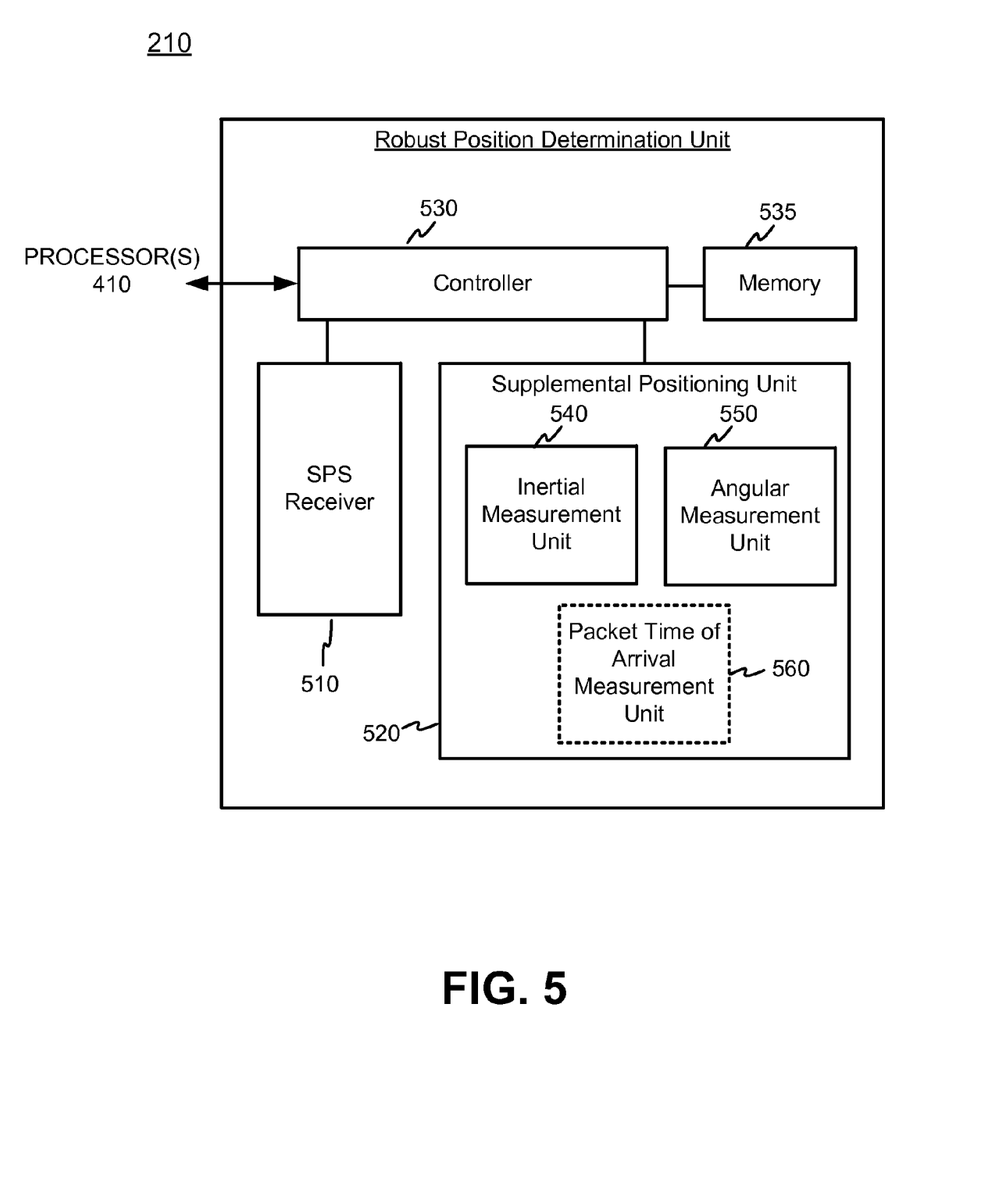
FIG. 5 is a block diagram showing exemplary components of a robust position determination unit shown in FIG. 4.

FIG. 5 is a block diagram showing exemplary components of robust position determination unit 210. Robust position determination unit 210 may include SPS receiver 510, supplemental positioning unit 520, controller 530, and memory 535. Supplemental positioning unit 520 may further include inertial measurement unit (IMU) 540, angular measurement unit 550, and optional (as indicated by dashed lines in FIG. 5) packet time of arrival measurement (PTAM) unit 560. Robust position determination unit 210 may provide accurate measurements of position to processor(s) 410 even when signals received by SPS satellites are insufficient to determine an SPS position. Accurate positioning may be accomplished by having supplemental positioning unit 520 generate additional position values to supplement SPS positions values when SPS receiver 510 is unable to generate accurate position values.

SPS receiver 510 may be connected to controller 530 over a standard interface (which may be a bus or an appropriate serial interface) where SPS receiver 510 provides data to controller 530 that may include position values and accuracy indicators thereof. The accuracy indicators may include, for example, dilution of precision (DOP) values such as geometric DOP (GDOP), horizontal DOP (HDOP), position DOP (PDOP), etc. The accuracy of the position generated by SPS receiver 510 may depend on a wide variety of factors, including, for example, the number of satellites in view of SPS receiver 510, the relative placement of the satellites with respect to SPS receiver 510 (i.e., the geometric configuration of the satellites), and the wireless channel conditions which may affect signals broadcast by the satellites. Additionally, the environment in which SPS receiver 510 is operating may affect the position accuracy of SPS receiver 510. For example, the accuracy of SPS receiver 510 may be reduced during indoor operation, as buildings may attenuate or completely block SPS signals transmitted by satellites. Additionally, even when operating outdoors in urban environments, SPS signals may be compromised by shadowing and/or multipath interference cause by buildings.

Controller 530 may receive position values and accuracy indicators from SPS receiver 510. If the accuracy indicators indicate that the SPS position values are accurate, then controller 530 may provide the position values to processor(s) 410. If the accuracy indicators indicate that the SPS position values are inaccurate, controller 530 may determine additional position values based on information received from supplemental positioning unit 520. In one embodiment, controller 530, operating in accordance with instructions provided from memory 535, may combine the SPS position values with the additional position values to improve accuracy, and provide the combined position values to processor(s) 410. In another embodiment, controller 530 may simply provide the SPS position values and additional position values to processor(s) 410, and processor(s) 410 may combine SPS position values and additional position values to improve the accuracy of the position of RRH 120-x.

In one embodiment, the additional position values may be determined by controller 530 in the form of position displacements from a last known "good" SPS position value, and the position displacements may be combined with the last known good SPS position value to determine a current position value. The additional positions values may be determined by controller 530 from acceleration data provided by IMU 540. Controller 530 may receive accelerations values in three dimensions from IMU 540, and integrate the accelerations into position displacements. The position displacements may be combined with the last known good SPS value through the appropriate transforms based on angles determined by angular measurement unit 550. In an embodiment, controller 530 may transform the position displacements to a common reference coordinate system, and add or apply the position displacements to the last known good SPS position value to determine a current position of RRH 120-x. Additional processing steps to improve the accuracy of the current position may be performed such as filtering (e.g., linear and non-linear filtering for noise reduction, Kalman based filtering for improved accuracy, etc.), statistical processing, and/or any conventional data enhancement techniques. Once an accurate current position value of RRH 120-x is determined, controller 530 may provide the current position value to processor(s) 410.

In an alternative embodiment, the aforementioned processing taking place on controller 530 may alternatively be performed in-part or entirely on processor(s) 410. For example, controller 530 may provide the last known good SPS value and the appropriate information from IMU 540 and/or angular measurement unit 550. Processor(s) 410 may integrate the accelerations into position displacements, transform the position displacements into a common reference system, perform filtering, statistical processing, and/or combining the position displacements with the last known good SPS value In another embodiment, if the accuracy indicators (e.g., GDOP) indicate that the SPS position values are inaccurate, controller 530 may determine additional position values based on information received from a different positioning source within robust position determination unit 210, such as, for example PTAM unit 560. In one embodiment, controller 530, operating in accordance with instructions provided from memory 535, may combine or replace the SPS position values with the position values provided by the PTAM unit 560 to improve accuracy, and provide the combined or replaced position values to processor(s) 410.

As noted above, when SPS receiver 510 receives signals having adequate quality from a sufficient number of satellites, controller 530 may provide accurate position values to processor(s) 410 and provide the position values the controller 530. In such a case, additional position values from supplemental positioning unit 520 will not be used in the event they are being generated. In some embodiments, controller 530 may instruct one or more units in supplemental positioning unit 520 to go into a "sleep" mode to conserve power.

SPS receiver 510 may measure position values in a standard reference system (e.g., WGS 84 as used in the Global Positioning System (GPS)) and may further include time tags in a standard time reference. The time tags, when available, may serve as an additional or alternative time reference to the time reference data provided over the wired connections through, for example, CPRI interface 425. The position values may further include altitude values to describe positions in three dimensions (e.g., latitude (lat.), longitude (lon.), altitude (alt.)). In some instances, only two-dimensional positions may be available (e.g., lat., lon.). Alternatively, positions may be described by using rectangular coordinates in a common reference frame (WGS-84). SPS receiver 510 may be any system that provides position data using a receiver specifically designed to determine positions, using conventional techniques, from a plurality of signals transmitted by a constellation of satellites and/or pseudo satellites (e.g., ground based stations which transmit SPS signals). Various SPSs may be used, which typically include a system of transmitters positioned to enable SPS receiver 510 to determine its location based on signals received from the transmitters. In a particular example, such transmitters may be located on Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation. Further, SPS receiver 510 may collect signal strength that indicates the location accuracy of the position data. Alternatively, SPS receiver 510 may compute quality metrics (e.g., GDOP, HDOP, VDOP, PDOP, etc.) indicating the accuracy of the derived position values.

Controller 530 may include a processor, microprocessor, and/or processing logic that may interpret and execute instructions. Controller 530 may additionally or alternatively be realized using dedicated hardware, such as, for example, application specific integrated circuits (ASICs), floating point gate arrays (FPGAs), etc., for performing operations. Controller 530 may further have integrated memory for storing data and/or instructions (not shown). External memory 535 may be used in addition or as an alternative to internal memory for storing instructions and/or data. Memory 535 may include a random access memory (RAM), read only memory (ROM), or any another type of volatile and/or non-volatile storage device that may store data and/or instructions for use by controller 530.

IMU 540 may measure accelerations in one or more dimensions which may be integrated into position displacements. IMU 540 may be realized as a micro electro-mechanical system (MEMS) which may simultaneously measure accelerations in three dimensions. IMU 540 may be realized in a single package using a standard interface to communicate with controller 530. In an embodiment, IMU 540 may also sense accelerations which may be used to indicate that RRH 120-*x* is being moved from a stationary position. Upon sensing an acceleration which indicates a transition from a stationary state to movement, controller 530 may update the position with position displacements so that the position value of the RRH 120-*x* accurately reflects the movement to a new location. In another embodiment, RRH 120-*x* may also provide an alarm indicating RRH 120-*x* has been moved to a new location, where the alarm may include a visual and/or audible indication, and/or an alert provided over a wireless channel and/or wired channels 130.

Angular measurement unit 550 may measure angles around one or more orthogonal axes to indicate rotations of RHH 120-*x*. For example, angular measurement unit 550 may simultaneously measure the roll, pitch, and yaw of RRH 120-*x* in terms of angular rates, and integrate the angular rates to determine angular displacements about the roll, pitch, and yaw axes. The angular measurements may be performed using MEMS gyroscopes, laser ring gyroscopes, fiber optic gyroscopes, etc. Angular measurement unit 550 may further include sensors which may measure an angle with respect to a fixed reference. For example, a magnetometer may be used to measure an orientation RRH 120-*x* with respect to a fixed reference, such as, for example, the magnetic north pole of the earth.

PTAM unit 560 may use one or more wireless networks to determine a position of RRH 120-*x* based on one or more wireless networks. PTAM unit 560 may include its own wireless transceiver, or may operate in conjunction with wireless transmitter within analog front end 220 and antenna 250 in RRH 120-*x*. In other embodiments, for example, if a robust position determination unit 210 is included in a UE 110-*x*, PTAM unit 560 may work in conjunction with any transceiver protocol that is supported by UE 110-*x*, which may include LTE, GSM, Wi-Fi, Bluetooth LE, etc. PTAM unit 560 may use trilateration based on time delays of received packets from at least three distinct transmitters to determine a position value in three dimensional space. Unlike IMU 540, PTAM unit 560 may provide "absolute" position values in a reference coordinate system, instead of displacements from a last known good SPS position value.

As described herein, RRH 120-*x* may perform certain operations in response to processor(s) 410 executing software instructions contained in a computer-readable medium, such as memory 415. A computer-readable medium may be defined as a non-transitory memory device. A non-transitory memory device may include memory space within a single physical memory device or spread across multiple physical memory devices. The software instructions may be read into memory 415 from another computer-readable medium or from another device via wired connection 130. The software instructions contained in memory 415 may cause processing unit 410, in conjunction with robust position determination unit 210, to generate and provide position data of RRH 120-*x* in an environment with or without SPS signal coverage. Alternatively, hardwired circuitry may be used in place of, or in combination with, software instructions to implement processes described herein. Thus, implementations described herein are not limited to any specific combination of hardware circuitry and software.

Although FIG. 5 shows example components of robust position determination unit 210, in other implementations, robust position determination unit 210 may include fewer components, different components, differently arranged components, or additional components than those depicted in FIG. 5. Additionally or alternatively, one or more components of robust position determination unit 210 may perform the tasks described as being performed by one or more other components of robust position determination unit 210.

Figure 6:
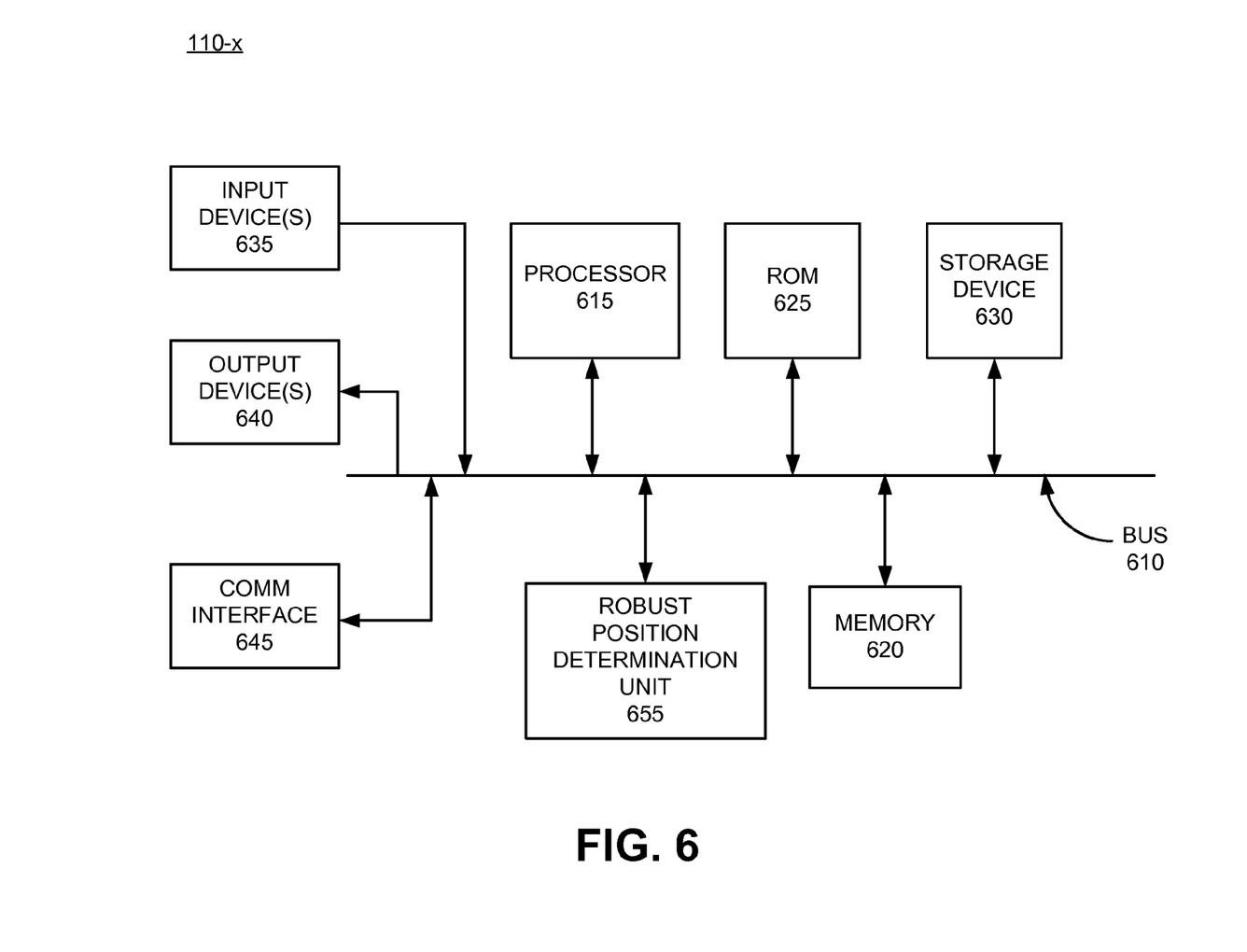
FIG. 6 is a block diagram illustrating an exemplary user equipment (UE) according to an embodiment.

FIG. 6 is a block diagram illustrating an exemplary UE 110-*x* which may generate position values based on information from robust position determination unit. UE 110-*x* may include any mobile or fixed communication device configured to communicate with RHHs 120 via wireless signals. For example, UE 110-*x* may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a wearable computer; a media playing device; a portable gaming system; and/or any type of device with wireless communication capability. UE 110-*x* may include a bus 610, a processor 615, memory 620, a read only memory (ROM) 625, a storage device 630, one or more input device(s) 635, one or more output device(s) 640, a communication interface 645, and robust position determination unit 655. Bus 610 may include a path that permits communication among the elements of UE 110-*x*.

UE 110-*x* may typically rely on position values determined by an on-board SPS receiver. However, when UE 110-*x* loses line of sight to a sufficient number of satellites due to physical occlusion, and/or the wireless signals are otherwise reduced in quality (e.g., due to multipath interference), the SPS receiver may no longer generate accurate position values of UE 110-*x*. In such an instance, robust position determination unit 655 may fall back to supplemental position determination units to provide additional position values which may be used to improve and/or replace the inaccurate position values provided by the SPS receiver with UE 110.

Processor 615 may include a processor, microprocessor, or processing logic that may interpret and execute instructions. Memory 620 may include a random access memory (RAM) or another type of dynamic storage device that may store information and instructions for execution by processor 615. ROM 625 may include a ROM device or another type of static storage device that may store static information and instructions for use by processor 615. Storage device 630 may include a magnetic and/or optical recording medium and its corresponding drive.

Input device(s) 635 may include one or more mechanisms that permit an operator to input information to UE 110-*x*, such as, for example, a keypad or a keyboard, a microphone, voice recognition, components for a touchscreen, and/or biometric mechanisms, etc. Output device(s) 640 may include one or more mechanisms that output information to the operator, including a display (e.g., an LCD), a speaker, etc. Communication interface 645 may include any transceiver mechanism that enables UE 110-x to communicate with other devices and/or systems. For example, communication interface 645 may include mechanisms for communicating with another device or system via a network through RHHs 120 via wireless channels 115.

Robust position determination unit 655 may include a controller, an SPS receiver, and a supplemental positioning unit. The supplemental positioning unit may include an IMU, an angular measurement unit, and a PTAM unit 560. The components and operation of robust position determination unit 655 may be similar to robust determination position unit 210 described in detail in reference to FIG. 5, and will not be repeated for brevity. The components of robust position determination unit 655 may be selected and configured to operate under reduce power conditions as UE 110-x may rely upon power which is limited to an on-board battery.

UE 110-x may perform certain operations or processes, as may be described in detail below. UE 110-x may perform these operations in response to processor 615 executing software instructions contained in a non-transitory computer-readable medium, such as memory 620. A non-transitory computer-readable medium may be defined as a physical or logical memory device. A logical memory device may include memory space within a single physical memory device or spread across multiple physical memory devices. The software instructions may be read into memory 620 from another computer-readable medium, such as storage device 630, or from another device via communication interface 645. The software instructions contained in memory 620 may cause processor 615 to perform operations or processes. For example, processor 615 may work in conjunction with robust position determination unit 655 to determine position values of UE 110-x upon transitions to areas lacking SPS satellite coverage. The flowchart illustrated in FIG. 8 and described below is an exemplary process which may execute on processor 615 and/or a controller in robust determination unit 655. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE 110-x illustrated in FIG. 6 is for illustrative purposes only. It should be understood that other configurations may be implemented. Therefore, UE 110-x may include additional, fewer and/or different components than those depicted in FIG. 6.

Figure 7:
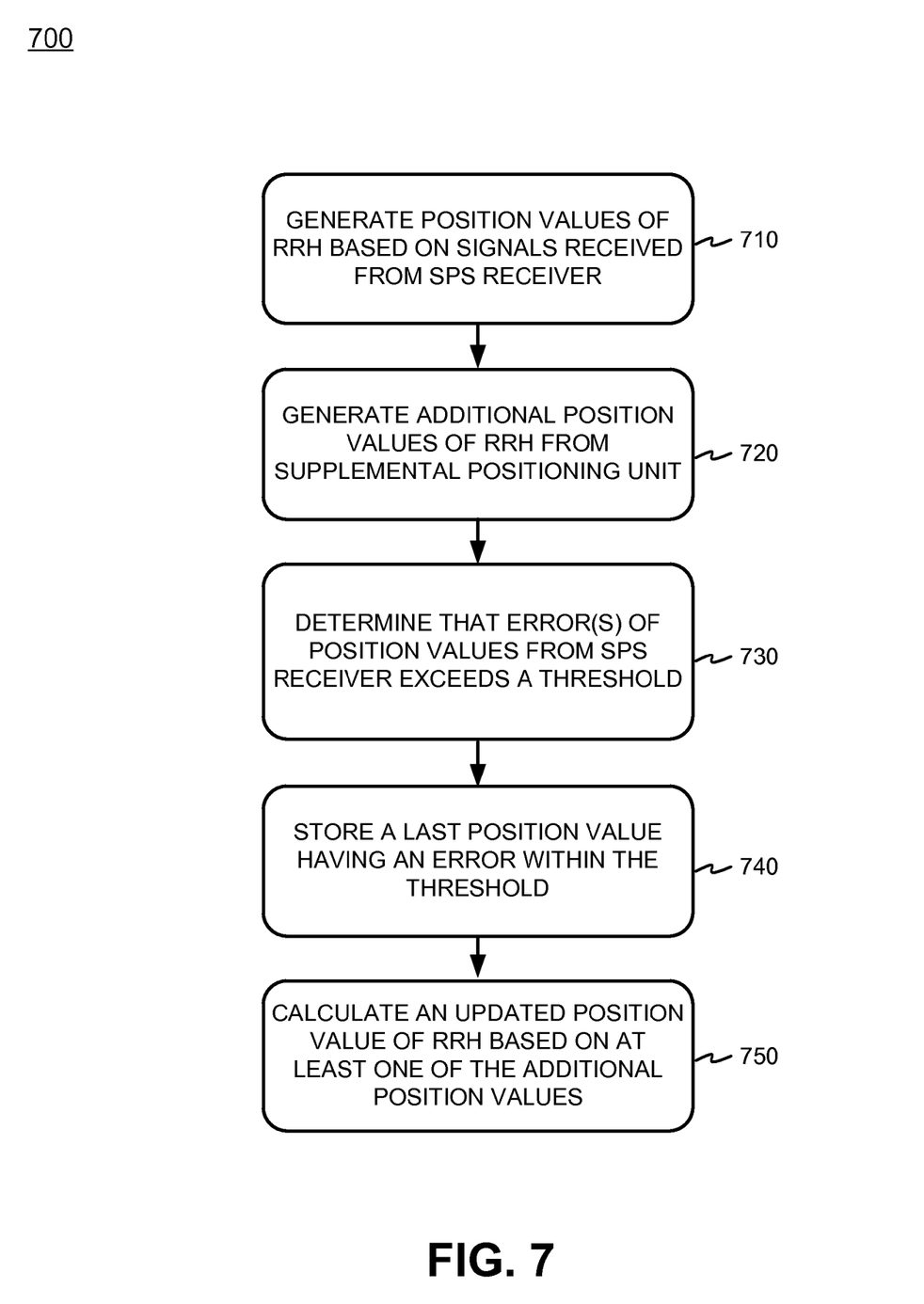
FIG. 7 is a flow chart showing an exemplary process for robust position determination associated with the remote radio head shown in FIG. 4.

FIG. 7 is a flow chart showing an exemplary process 700 for robust position determination associated with the RRH 120-x shown in FIG. 4. Process 700 may be performed by processor 410 in RRH 120-x and/or by robust position determination unit 210. In an embodiment, RRH 120-x may generate position values of the remote radio head based on signals received by a satellite positioning system (SPS) receiver (Block 710). In an embodiment, for example, when a technician installs RRH 120-x, RRH 120-x may enter a mode associated with an indoor installation, based on a command by the technician. RRH 120-x may then initiate the generation of the position values of the remote radio head by the SPS receiver 510. RRH 120-x may then provide an indication that valid position values of RRH 120-x are being generated. The indication may be provided, for example, by a light emitting diode (LED) on RRH 120-x.

RRH 120-x may generate additional position values of RRH 120-x from a supplemental positioning unit (Block 720). In an embodiment, generating the additional position values may include having RRH 120-x determine accelerations in three dimensions, integrate the measured accelerations to generate the position displacements in three dimensions, and determine an orientation of the remote radio head. In an embodiment, supplemental positioning unit 520 within RRH 120-x may determine accelerations by measuring signals generated by a micro electro mechanical system (MEMS) accelerometer, and converting the measured signals into acceleration values. Additionally, RRH 120-x may determine an orientation of the remote radio head by measuring signals generated by a MEMS gyroscope, and converting the signals to angular displacement values corresponding to at least one axis. Supplemental positioning unit 520 within RRH 120-x may further determine an orientation by measuring signals generated by a magnetometer, and converting the signals to a reference angle. The reference angle may be an angle with respect to the Earth's magnetic north pole.

RRH 120-x may determine that an error of at least one of the position values exceeds a threshold (Block 730). In an embodiment, RRH 120-x may generate the additional position values associated with the remote radio head in response to determining that the error of at least one of the position values exceeded the threshold. In order to save power, supplemental positioning unit 520 may be placed within a sleep mode when SPS receiver 510 generates accurate position values that are within the error threshold. Upon the error threshold being exceeded, supplemental positioning unit 520 may transition out of sleep mode, for example, by command of controller 530, to begin generating additional position values. In an embodiment, in order to save power, RRH 120-x may determine from the position values and/or additional position values that the remote radio head is stationary. In response to determining that RRH 120-x is stationary, RRH 120-x may discontinue calculation of both SPS position values and additional position values.

RRH 120-x may store a last position value from position values having a corresponding error value that is within the threshold, in response to determining that the error of at least one of the position values exceeds the threshold (Block 740).

RRH 120-x may calculate an updated position value of the remote radio head based on at least one of the additional position values (Block 750). The calculation of the updated position may include RRH 120-x combining or applying the last position value with at least one of the additional position values, wherein the additional position values are position displacements with respect to the last position value.

In an embodiment, RRH 120-x may receive a timing signal over a wired connection. The timing signal may be received over a fiber optic connection based on a common public radio interface (CPRI) protocol.

The following description illustrates an exemplary scenario of how RRH 120-x having robust positioning determination unit 210 may be used during installation in an indoor facility, such as, for example, in a mall or stadium. RRH 120-x may provide wireless services to UEs 110 within the indoor facility, which may include, for example, location services for guiding users to locations (such as rest rooms, eateries, lounges, etc.) within the facility. Upon installing the RRH 120-x indoors, the technician may place RRH 120-x into a mode to compensate for the effects of indoor installation on SPS signals. For example, the technician may initiate the installation by placing RRH 120-x outdoors, and then activating a switch on RRH 120-*x* to permitting indoor installation compensation. The switch may activate an LED which changes state to indicate that SPS receiver 510 has acquired a position lock for RRH 120-*x*. Once the position is locked, the technician may carry RRH 120-*x* indoors to the installation site. In an embodiment, RRH 120-*x* may provide a visual or audible warning if the technician is moving the RRH 120-*x* too quickly for RRH 120-*x* to determine position values. At some point upon transitioning inside, SPS receiver 510 may be unable to generate sufficiently accurate position values due to the line of site to SPS satellites being occluded by the building. Once the position values generated by SPS receiver 510 exceed an error threshold, supplemental positioning unit 520 may provide additional position values which may be used to improve the position accuracy of RRH 120-*x*.

Figure 8:
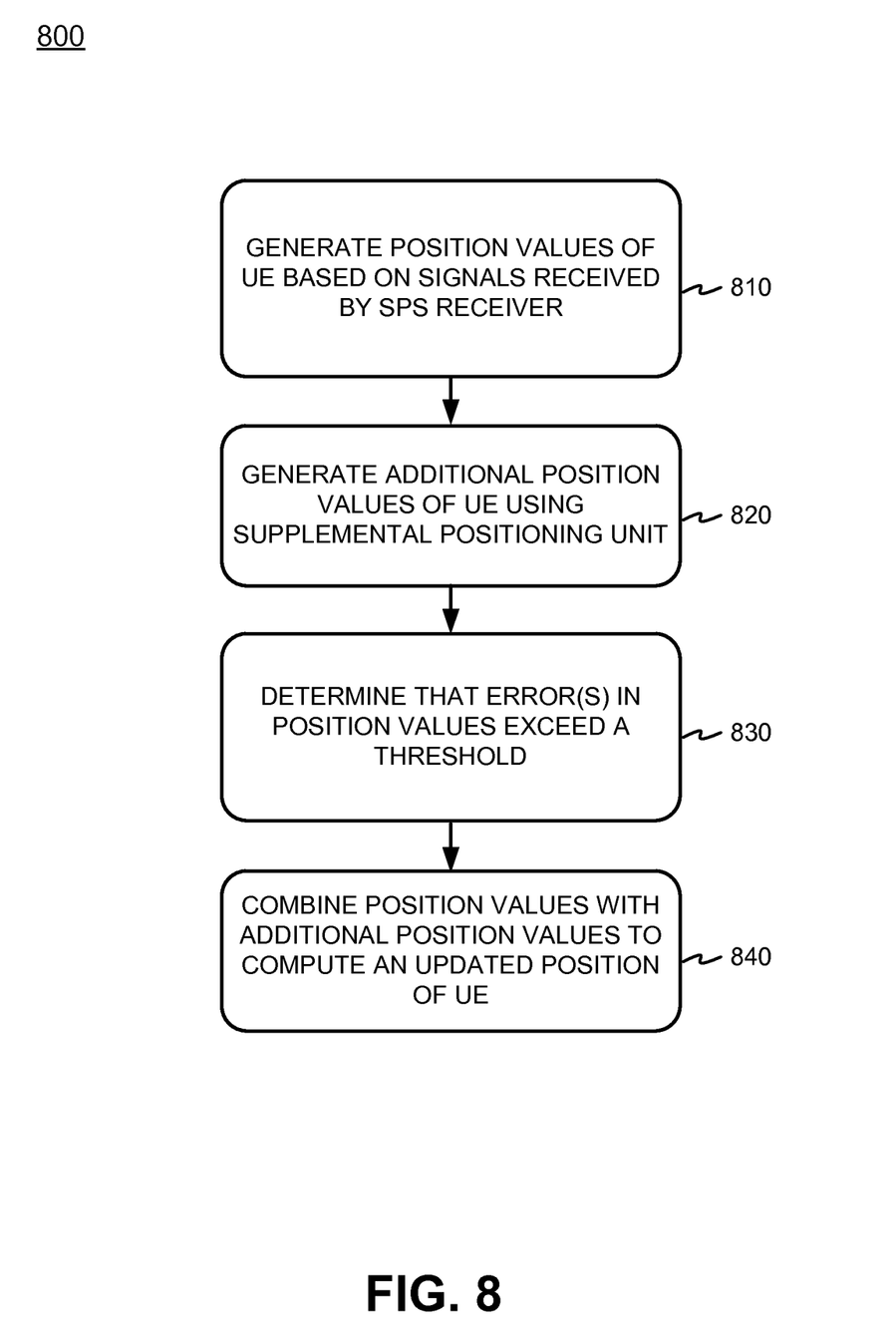
FIG. 8 is a flow chart showing an exemplary process for robust position determination associated with the user equipment shown in FIG. 5.

FIG. 8 is a flow chart showing an exemplary process 800 associated with UE 110-*x* for robust determination of a position. Process 800 may be performed by processor 615 in UE 110-*x* and/or within robust position determination unit 655. In an embodiment, UE 110-*x* may generate position values based on signals received by an SPS receiver (Block 810). UE 110-*x* may further generate additional position values using a supplemental positioning unit (Block 820), such as robust position determination unit 655. The UE 110-*x* may determine that errors in the position values determined by the SPS receiver in robust position determination unit 655 exceed a threshold (Block 830). In response, UE 110-*x* may combine or apply position values determined by the SPS receiver with the additional position values determined by the supplemental positioning unit (e.g. unit 655) to compute an updated position of the UE 110-*x* having improved accuracy (Block 840).

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 7 and 8, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for determining a position of a remote radio head, comprising:
   generating position values of the remote radio head based on signals received by a satellite positioning system (SPS) receiver;
   generating additional position values of the remote radio head from a supplemental positioning unit;
   determining whether an error of at least one of the position values exceeds a threshold;
   storing a last position value from position values having an error within the threshold, in response to determining that the error of at least one of the position values exceeds the threshold; and
   calculating an updated position value of the remote radio head based on at least one of the additional position values.

2. The method of claim 1, wherein calculating an updated position value further comprises:
   combining the last position value with at least one of the additional position values, wherein the additional position values are position displacements.

3. The method of claim 2, wherein generating additional position values comprises:
   determining accelerations in three dimensions;
   integrating the determined accelerations to generate the position displacements in three dimensions; and
   determining an orientation of the remote radio head.

4. The method of claim 3, wherein determining accelerations further comprises:
   measuring signals generated by a micro electro mechanical system (MEMS) accelerometer; and
   converting the measured signals into acceleration values.

5. The method of claim 3, wherein determining an orientation of the remote radio head comprises:
   measuring signals generated by a MEMS gyroscope; and
   converting the signals to angular displacement values corresponding to at least one axis.

6. The method of claim 3, wherein determining an orientation of the remote radio head comprises:
   measuring signals generated by a magnetometer; and
   converting the signals to an angle with respect to a fixed reference.

7. The method of claim 1, wherein generating position values of the remote radio head comprises:
   entering a mode associated with an indoor installation;
   initiating the generation of the position values of the remote radio head; and
   providing an indication that valid position values of the remote radio head are being generated.

8. The method of claim 1, wherein generating additional position values further comprises:
   generating the additional position values associated with the remote radio head in response to determining that the error of at least one of the position values exceeded the threshold.

9. The method of claim 1, further comprising:
   determining from the additional position values that the remote radio head is stationary; and discontinuing calculation of the updated position value in response to determining the remote radio head is stationary.

10. The method of claim 1, further comprising:
receiving a timing signal over a wired connection.

11. The method of claim 10, wherein receiving the timing signal further comprises:
receiving the timing signal over a fiber optic connection based on a common public radio interface (CPRI) protocol.

12. A remote radio head, comprising:
an antenna configured to exchange radio frequency signals over wireless channels to communicate with at least one user equipment (UE);
an analog front end coupled to the antenna;
a communications interface configured to exchange data with a central office;
a position determination unit further comprising:
a satellite positioning system (SPS) receiver configured to generate position values of the remote radio head based on signals received from a satellite positioning system; and
a supplemental positioning unit configured to generate additional position values of the remote radio head;
a memory configured to store instructions; and
at least one processor, coupled to the analog front end, the communications interface and the memory, wherein the at least one processor is configured to execute the instructions stored in the memory to:
determine whether an error of at least one of the position values exceeds a threshold,
store a last position value from position values having an error within the threshold, in response to determining that the error of at least one of the position values exceeds the threshold, and
calculate an updated position value of the remote radio head based on at least one of the additional position values.

13. The remote radio head of claim 12, wherein the instructions to calculate an updated position value further configures the processor to:
combine the last position value with at least one of the additional position values, wherein the additional position values are position displacements.

14. The remote radio head of claim 13, wherein the supplemental positioning unit comprises:
an inertial measurement unit configured to determine accelerations in three dimensions, and integrate the determined accelerations to generate the position displacements in three dimensions; and
an angular measurement unit configured to determine an orientation of the remote radio head.

15. The remote radio head of claim 14, wherein the inertial measurement unit comprises:
a MEMS accelerometer configured to generate signals corresponding to accelerations, and convert the generated signals into acceleration values.

16. The remote radio head of claim 14, wherein the angular measurement unit comprises:
a micro electro mechanical system (MEMS) gyroscope configured to generate signals corresponding to angular displacements, and convert the signals to angular displacement values for at least one axis.

17. The remote radio head of claim 14, wherein the angular measurement unit comprises:
a magnetometer configured to measure signals generated by a magnetic field, and convert the signals into an angle with respect to a fixed reference.

18. The remote radio head of claim 12, wherein generating additional position values further comprises:
generating the additional position values associated with the remote radio head in response to determining that the error of at least one of the position values exceeded the threshold.

19. The remote radio head of claim 12, wherein the communications interface configured to exchange data with a central office comprises:
a common public radio interface (CPRI) configured to receive a timing signal.

20. The remote radio head of claim 19, wherein the CPRI communicates with the central office over a fiber optic connection.

* * * * *